US012670143B2

(12) United States Patent
Yang et al.

(10) Patent No.: US 12,670,143 B2
(45) Date of Patent: Jun. 30, 2026

(54) METHODS AND APPARATUSES FOR CREATING PARTITION TABLE, AND DATA WRITING AND READING METHODS AND APPARATUSES FOR PARTITION TABLE

(71) Applicant: Beijing OceanBase Technology Co., Ltd., Beijing (CN)

(72) Inventors: Jiawei Yang, Beijing (CN); Zhenjiang Xie, Beijing (CN); Yuzhong Zhao, Beijing (CN); Jianyun Sun, Beijing (CN); Hongqin Li, Beijing (CN); Jixiong Liu, Beijing (CN)

(73) Assignee: Beijing OceanBase Technology Co., Ltd., Beijing (CN)

( * ) Notice: Subject to any disclaimer, the term of this patent is extended or adjusted under 35 U.S.C. 154(b) by 0 days.

(21) Appl. No.: 18/920,487

(22) Filed: Oct. 18, 2024

(65) Prior Publication Data

US 2025/0045268 A1     Feb. 6, 2025

Related U.S. Application Data

(63) Continuation of application No. PCT/CN2023/087010, filed on Apr. 7, 2023.

(30) Foreign Application Priority Data

Apr. 18, 2022     (CN) ......................... 202210402300.7

(51) Int. Cl.
| | |
|---|---|
| *G06F 16/22* | (2019.01) |
| *G06F 16/2455* | (2019.01) |
| *G06F 16/27* | (2019.01) |

(52) U.S. Cl.
CPC ...... *G06F 16/2282* (2019.01); *G06F 16/2246* (2019.01); *G06F 16/24564* (2019.01); *G06F 16/278* (2019.01)

(58) Field of Classification Search
CPC ............. G06F 16/2246; G06F 16/2282; G06F 16/24564; G06F 16/278
See application file for complete search history.

(56) References Cited

U.S. PATENT DOCUMENTS

| | | | |
|---|---|---|---|
| 6,859,808 | B1 | 2/2005 | Chong et al. |
| 8,572,091 | B1 | 10/2013 | Sivasubramanian et al. |
| | | | (Continued) |

FOREIGN PATENT DOCUMENTS

| | | |
|---|---|---|
| CN | 101876983 A | 11/2010 |
| CN | 104067216 A | 9/2014 |
| | (Continued) | |

OTHER PUBLICATIONS

Gao, "Large database optimization method using table partitioning," Computer Knowledge and Technology, Sep. 2018, 14(26):18-19 (with English abstract).

(Continued)

*Primary Examiner* — James E Richardson
(74) *Attorney, Agent, or Firm* — Fish & Richardson P.C.

(57) ABSTRACT

A computer-implemented method for partition table data writing includes obtaining a first data row to be written into a first partition table and a current partitioning rule indicating at least that the first partition table includes a partitioning key that is a basis for dividing data rows to be written into logical partitions and a first quantity of partitions. A target logical partition corresponding to the first data row is determined. A target physical partition is determined, where the target physical partition has a globally unique partition identifier. The globally unique partition identifier of the target physical partition and an auto-increment identifier of the first data row to the first data row are added as a (Continued)

Obtain a first data row to be written into a first partition table and a current partitioning rule for the first partition table — S502

Determine a target logical partition corresponding to the first data row based on the current partitioning rule and a first attribute value of the first data row that corresponds to the partitioning key — S504

Determine a target physical partition corresponding to the target logical partition based on a mapping relationship between a logical partition and a physical partition, where the target physical partition has a globally unique partition identifier — S506

Add the partition identifier of the target physical partition and an auto-increment identifier of the first data row to the first data row as a composite primary key value — S508

Store the first data row with the added composite primary key value to the first partition table — S510 composite primary key value. The first data row with the composite primary key value is stored to the first partition table.

20 Claims, 6 Drawing Sheets

(56)                    References Cited

U.S. PATENT DOCUMENTS

| | | | |
|---|---|---|---|
| 2012/0143823 A1* | 6/2012 | Jain | G06F 16/22 |
| | | | 707/812 |
| 2012/0158722 A1* | 6/2012 | Gao | G06F 16/2282 |
| | | | 707/E17.089 |
| 2015/0205885 A1 | 7/2015 | Zhou et al. | |
| 2015/0379056 A1 | 12/2015 | Bolik | |
| 2021/0318826 A1* | 10/2021 | Wei | G06F 3/067 |
| 2021/0374138 A1 | 12/2021 | Delbru | |
| 2023/0169093 A1* | 6/2023 | Whitaker | G06F 16/278 |
| | | | 707/803 |

FOREIGN PATENT DOCUMENTS

| | | | | |
|---|---|---|---|---|
| CN | 107085570 A | 8/2017 | | |
| CN | 107247734 A | 10/2017 | | |
| CN | 111427887 A | 7/2020 | | |
| CN | 113590613 A | 11/2021 | | |
| CN | 114490674 A | 5/2022 | | |
| CN | 115794813 A | 3/2023 | | |
| WO | WO-2020052379 A1 * | 3/2020 | .......... | G06F 16/907 |

OTHER PUBLICATIONS

International Preliminary Report on Patentability in International Appln. No. PCT/CN2023/087010, mailed on Oct. 31, 2024, 12 pages (with English translation).

International Search Report and Written Opinion in International Appln. No. PCT/CN2023/087010, mailed on Jun. 20, 2023, 15 pages (with English translation).

Zhao et al., "Research on Oracle Partitioned Table and Partitioned Index in VLDB," Journal of Chengdu University (Natural Science), Dec. 2016, 35(4):358-360, 4 pages (with English abstract).

* cited by examiner

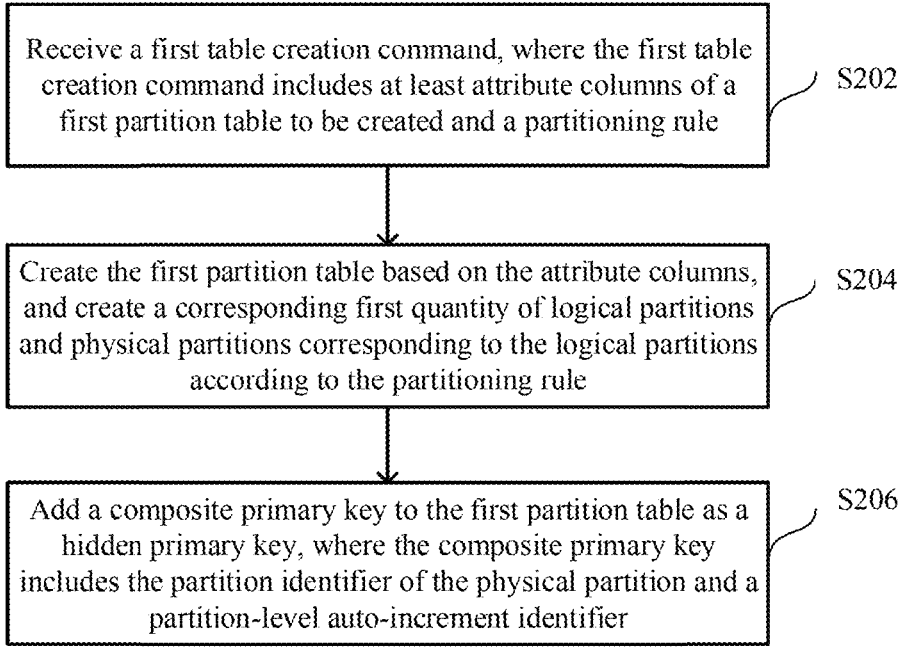

Receive a first table creation command, where the first table creation command includes at least attribute columns of a first partition table to be created and a partitioning rule          S202

Create the first partition table based on the attribute columns, and create a corresponding first quantity of logical partitions and physical partitions corresponding to the logical partitions according to the partitioning rule          S204

Add a composite primary key to the first partition table as a hidden primary key, where the composite primary key includes the partition identifier of the physical partition and a partition-level auto-increment identifier          S206

FIG. 2

| Composite primary key | | Other columns | | |
|---|---|---|---|---|
| Partition identifier | Auto-increment identifier | True column 1 | ... | True column N |

FIG. 3

| Index column 1 | ... | Index column N | Composite primary key (partition identifier + auto-increment identifier) | Partitioning key |
|---|---|---|---|---|

FIG. 4

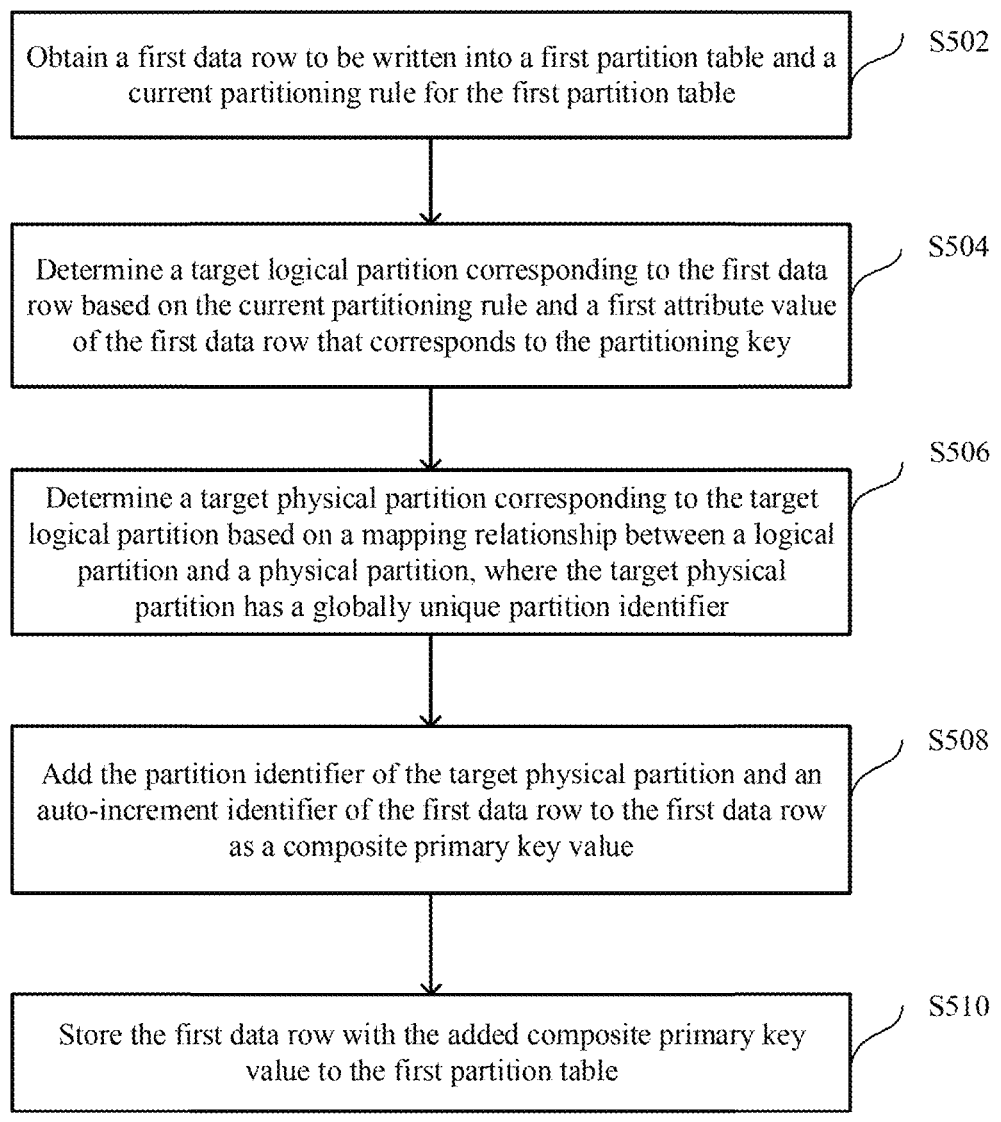

Obtain a first data row to be written into a first partition table and a current partitioning rule for the first partition table — S502

Determine a target logical partition corresponding to the first data row based on the current partitioning rule and a first attribute value of the first data row that corresponds to the partitioning key — S504

Determine a target physical partition corresponding to the target logical partition based on a mapping relationship between a logical partition and a physical partition, where the target physical partition has a globally unique partition identifier — S506

Add the partition identifier of the target physical partition and an auto-increment identifier of the first data row to the first data row as a composite primary key value — S508

Store the first data row with the added composite primary key value to the first partition table — S510

FIG. 5

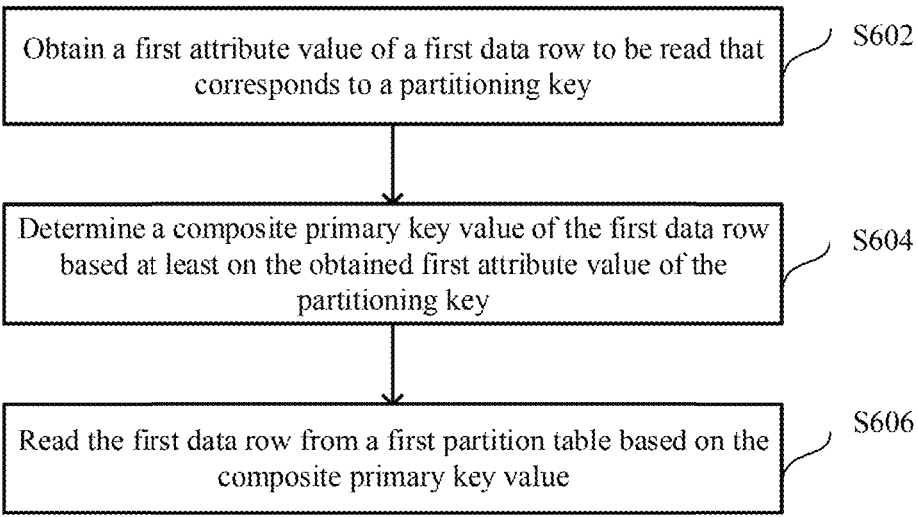

Obtain a first attribute value of a first data row to be read that corresponds to a partitioning key        S602

Determine a composite primary key value of the first data row based at least on the obtained first attribute value of the partitioning key        S604

Read the first data row from a first partition table based on the composite primary key value        S606

FIG. 6

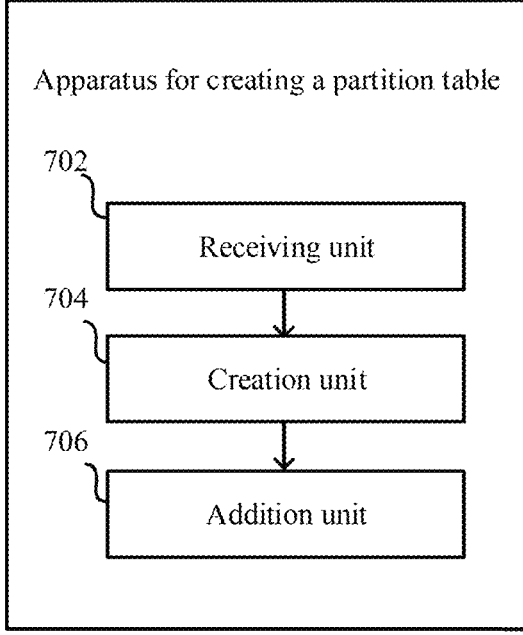

Apparatus for creating a partition table

702

Receiving unit

704

Creation unit

706

Addition unit

FIG. 7

METHODS AND APPARATUSES FOR CREATING PARTITION TABLE, AND DATA WRITING AND READING METHODS AND APPARATUSES FOR PARTITION TABLE

CROSS-REFERENCE TO RELATED APPLICATIONS

This application is a continuation of PCT Application No. PCT/CN2023/087010, filed on Apr. 7, 2023, which claims priority to Chinese Patent Application No. 202210402300.7, filed on Apr. 18, 2022, and each application is hereby incorporated by reference in its entirety.

TECHNICAL FIELD

One or more embodiments of this specification relate to the database field, and in particular, to a method and an apparatus for creating a partition table, and data writing and reading methods and apparatuses for a partition table.

BACKGROUND

Currently, many modern databases store data by using the log-structured-merge tree (LSM-tree). In a storage architecture of the LSM-tree, data are organized in a manner of a key-value pair, and a key here is generally taken from a primary key of a data table. However, there are still some tables with no primary keys in the database. For data in the table with no primary keys, how to implement storage based on the LSM-tree becomes a problem to be solved.

SUMMARY

One or more embodiments of this specification describe a method and an apparatus for creating a partition table, and data writing and reading methods and apparatuses for a partition table, so that a valid primary key can be generated for a table with no primary keys, to store data by using LSM-Tree.

According to a first aspect, a method for creating a partition table is provided, including: receiving a first table creation command, where the first table creation command includes at least attribute columns of a first partition table to be created and a partitioning rule, the first partition table is a table with no primary keys, and the partitioning rule indicates at least a partitioning key that is a basis for dividing data rows included in the first partition table to be written into logical partitions and a first quantity of partitions; creating the first partition table based on the attribute columns, and creating a corresponding first quantity of logical partitions and physical partitions respectively corresponding to the logical partitions according to the partitioning rule, where the physical partitions each have a globally unique partition identifier; and adding a composite primary key to the first partition table as a hidden primary key, where the composite primary key includes the partition identifier of the physical partition and a partition-level auto-increment identifier.

According to a second aspect, a data writing method for a partition table is provided, including: obtaining a first data row to be written into a first partition table and a current partitioning rule for the first partition table, where the current partitioning rule indicates at least that the first partition table includes a partitioning key that is a basis for dividing data rows included in the first partition table to be written into logical partitions and a first quantity of partitions; determining a target logical partition corresponding to the first data row based on the current partitioning rule and a first attribute value of the first data row that corresponds to the partitioning key; determining a target physical partition corresponding to the target logical partition based on a mapping relationship between a logical partition and a physical partition, where the target physical partition has a globally unique partition identifier; adding the partition identifier of the target physical partition and an auto-increment identifier of the first data row to the first data row as a composite primary key value; and storing the first data row with the added composite primary key value to the first partition table.

According to a third aspect, a data reading method for a partition table is provided, including: obtaining a first attribute value of a first data row to be read that corresponds to a partitioning key; determining a composite primary key value of the first data row based at least on the first attribute value of the partitioning key, where the composite primary key value includes a partition identifier of a target physical partition corresponding to the first data row and an auto-increment identifier of the first data row, and the target physical partitions each have a globally unique partition identifier; and reading the first data row from a first partition table based on the composite primary key value.

According to a fourth aspect, an apparatus for creating a partition table is provided, including: a receiving unit, configured to receive a first table creation command, where the first table creation command includes at least attribute columns of a first partition table to be created and a partitioning rule, the first partition table is a table with no primary keys, and the partitioning rule indicates at least a partitioning key that is a basis for dividing data rows included in the first partition table to be written into logical partitions and a first quantity of partitions; a creation unit, configured to create the first partition table based on the attribute columns, and create a corresponding first quantity of logical partitions and physical partitions respectively corresponding to the logical partitions according to the partitioning rule, where the physical partitions each have a globally unique partition identifier; and an addition unit, configured to add a composite primary key to the first partition table as a hidden primary key, where the composite primary key includes the partition identifier of the physical partition and a partition-level auto-increment identifier.

According to a fifth aspect, a data writing apparatus for a partition table is provided, including: an obtaining unit, configured to obtain a first data row to be written into a first partition table and a current partitioning rule for the first partition table, where the current partitioning rule indicates at least that the first partition table includes a partitioning key that is a basis for dividing data rows included in the first partition table to be written into logical partitions and a first quantity of partitions; a determining unit, configured to determine a target logical partition corresponding to the first data row based on the current partitioning rule and a first attribute value of the first data row that corresponds to the partitioning key; where the determining unit is further configured to determine a target physical partition corresponding to the target logical partition based on a mapping relationship between a logical partition and a physical partition, where the target physical partition has a globally unique partition identifier; an addition unit, configured to add the partition identifier of the target physical partition and an auto-increment identifier of the first data row to the first data row as a composite primary key value; and a storage unit, configured to store the first data row with the added composite primary key value to the first partition table.

According to a sixth aspect, a data reading apparatus for a partition table is provided, including: an obtaining unit, configured to obtain a first attribute value of a first data row to be read that corresponds to a partitioning key; a determining unit, configured to determine a composite primary key value of the first data row based at least on the first attribute value of the partitioning key, where the composite primary key value includes a partition identifier of a target physical partition corresponding to the first data row and an auto-increment identifier of the first data row, and the target physical partition has a globally unique partition identifier; and a reading unit, configured to read the first data row from a first partition table based on the composite primary key value.

According to a seventh aspect, a computer storage medium is provided. The computer storage medium stores a computer program, and when the computer program is executed on a computer, the computer is enabled to perform the method according to the first aspect, the second aspect, or the third aspect.

According to an eighth aspect, a computing device is provided, including a memory and a processor. The memory stores executable code, and the processor executes the executable code to implement the method according to the first aspect, the second aspect, or the third aspect.

One or more embodiments of this specification provide a method and an apparatus for creating a partition table, and data writing and reading methods and apparatuses for a partition table. A composite primary key is added to a table with no primary keys as a hidden primary key, and the composite primary key here includes a partition identifier of a physical partition and a partition-level auto-increment identifier. Therefore, a problem that data in the table with no primary keys cannot be stored by using LSM-Tree can be solved. In addition, since a partition identifier of a physical partition is globally unique, the uniqueness of the composite primary key can be ensured after partition management operations such as partition merging and partition switching are performed for partitions (including a logical partition and a physical partition) in the table with no primary keys.

BRIEF DESCRIPTION OF DRAWINGS

To describe the technical solutions in embodiments of this specification more clearly, the following briefly describes the accompanying drawings needed for describing the embodiments. Clearly, the accompanying drawings in the following description are merely some embodiments of this specification, and a person of ordinary skill in the art can still derive other drawings from these accompanying drawings without creative efforts.

FIG. 2 is a flowchart illustrating a method for creating a partition table, according to some embodiments;

FIG. 3 is a schematic diagram illustrating a first partition table with an added composite primary key;

FIG. 4 is a schematic diagram illustrating an index table of a first partition table;

FIG. 5 is a flowchart illustrating a data writing method for a partition table, according to some embodiments;

FIG. 6 is a flowchart illustrating a data reading method for a partition table, according to some embodiments;

FIG. 7 is a schematic diagram illustrating an apparatus for creating a partition table, according to some embodiments;

DETAILED DESCRIPTION OF THE INVENTION

Figure 1:
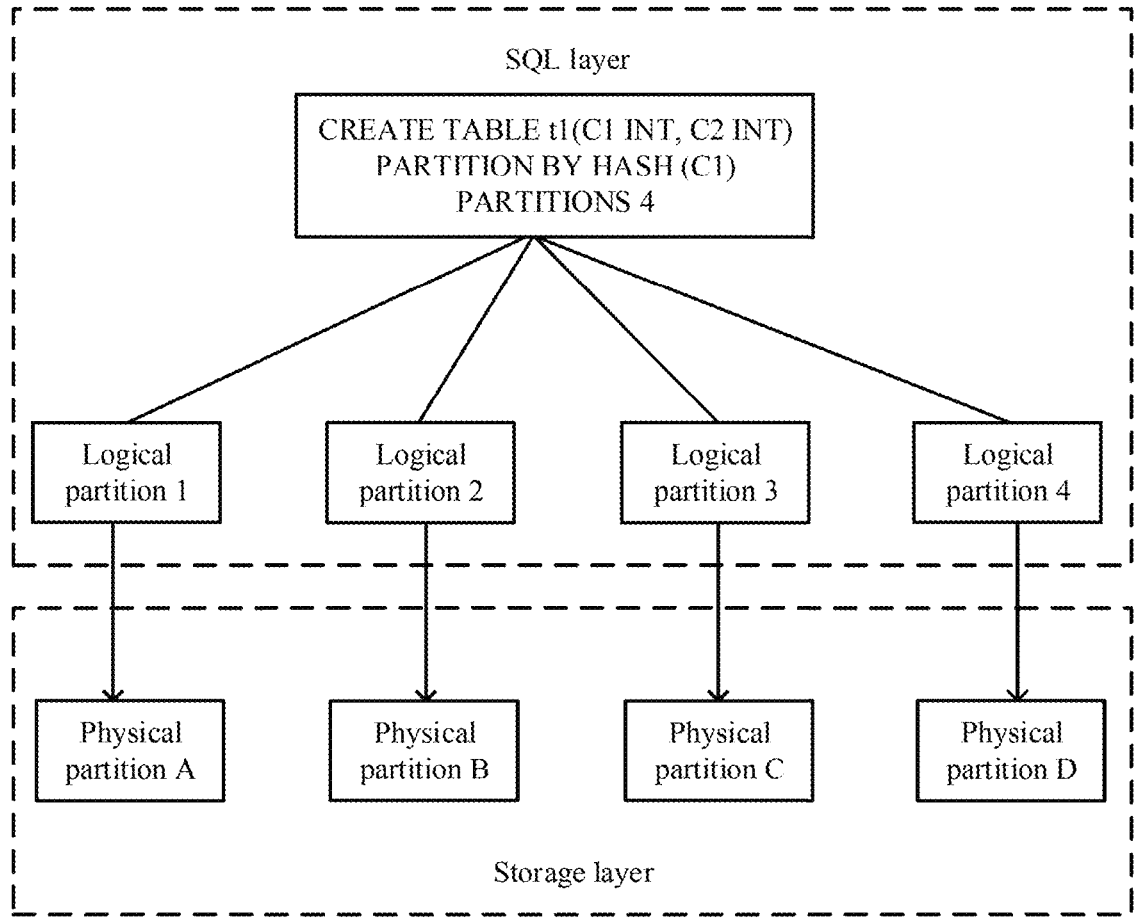
FIG. 1 is a schematic diagram illustrating an implementation scenario, according to some embodiments disclosed in this specification.

Solutions provided in this specification are described below with reference to the accompanying drawings.

Currently, a storage architecture used for a conventional database generally does not require a data table to have a primary key. An index table of the data table records an index column and a row identifier (ROWID) of a data row. However, after partition splitting, partition merging, and partition switching are performed on the data table, the row identifier of the data row changes, which invalidates the index table. Therefore, the index table needs to be recreated.

In MySQL InnoDB, for a table with no primary keys, a table-level auto-increment column is usually added as a hidden primary key. However, there may be a problem of a conflict between primary keys (or non-unique) when partition switching (usually between two tables) is performed for the table with no primary keys, which in turn requires rewriting of data. It can be learned that this method for adding the hidden primary key does not support partition switching.

Distributed databases represented by TiDB and CockroachDB store data by using LSM-Tree. A method for adding a hidden primary key is as follows:

In TiDB, for a table with no primary keys, a hidden auto-increment column is added as a hidden primary key, and the auto-increment column can control a quantity of spanning partitions based on a configuration item. The auto-increment column here can be of a table level, or can be of a partition level. However, if the auto-increment column is configured as a table level, there can be a problem of a conflict between primary keys after partition switching. If the auto-increment column is configured as a partition level, there can be a problem that two primary keys are the same in a partition after partition merging. It can be learned that this method for adding a primary key cannot support both partition merging and partition switching.

In CockroachDB, an SQL execution node ID and a timestamp are used as hidden primary keys for a table with no primary keys. In this method, the uniqueness of the primary key cannot be ensured in some extreme scenarios. For example, a large number of hidden primary keys are generated in a short time. In addition, when the SQL execution node ID is used as a part of the hidden primary key, in a scenario in which cluster running time is relatively long and there is a large quantity of reboots due to crash, the SQL execution node ID can exceed a range of storage of the hidden primary key in the table with no primary keys.

Since the above-mentioned methods for adding a hidden primary key have corresponding disadvantages, the inventors of this application propose that a composite primary key is added to a table with no primary keys as a hidden primary key, and the composite primary key here includes a partition identifier of a physical partition and a partition-level auto-increment identifier. Therefore, a problem that data in the table with no primary keys cannot be stored by using LSM-Tree can be solved. In addition, since a partition identifier of a physical partition is globally unique, the uniqueness of the composite primary key can be ensured after partition management operations such as partition merging and partition switching are performed for partitions (including a logical partition and a physical partition) in the table with no primary keys. That is, in this solution, a partition management operation for a table with no primary keys can be implemented without rewriting data.

FIG. 1 is a schematic diagram illustrating an implementation scenario, according to some embodiments disclosed in this specification. In FIG. 1, a database system can receive an SQL statement for creating a partition table. The SQL statement can indicate attribute columns C1 and C2 of a partition table t1 to be created and a partitioning rule. The partitioning rule can indicate that the partition table t1 includes a partitioning kay C1 that is a basis for dividing data rows included in the first partition table to be written into logical partitions and a quantity of partitions: 4. In addition, a hash partitioning method can be further indicated.

The above-mentioned SQL statement is executed to create the partition table t1, and corresponding four logical partitions and four physical partitions are created for the partition table t1. After the partition table t1 is created, a composite primary key can be added to the partition table t1 as a hidden primary key, and the composite primary key includes a partition identifier of a physical partition and a partition-level auto-increment identifier.

It should be understood that FIG. 1 is merely an example description. In actual application, the above-mentioned partitioning method may be alternatively a range partitioning method, etc., and the quantity of partitions may be alternatively another quantity. This is not limited in this specification.

FIG. 2 is a flowchart illustrating a method for creating a partition table, according to some embodiments. The method can be performed by any apparatus, device, platform, or device cluster with computing and processing capabilities. As shown in FIG. 2, the method can include the following steps.

Step 202: Receive a first table creation command, where the first table creation command includes at least attribute columns of a first partition table to be created and a partitioning rule.

The first table creation command here can be a structured query language (SQL) statement, or can be a statement of another database language that has a function similar to SQL, such as Transact-SQL.

The above-mentioned first partition table is a data table that can be divided into a plurality of logical partitions. Each logical partition corresponds to one subset of the first partition table, and each logical partition is operable by a user. In embodiments of this specification, the above-mentioned first partition table is a table with no primary keys.

The above-mentioned partitioning rule indicates at least that the first partition table includes a partitioning key that is a basis for dividing data rows included in the first partition table to be written into logical partitions and a first quantity of partitions (including a logical partition and a physical partition). The partitioning key usually includes at least one column in the attribute columns of the partition table.

In addition, the partitioning rule can further indicate a partitioning method, and the partitioning method here can include one of the following: a hash (Hash) partitioning method, a range (Range) partitioning method, a list (list) partitioning method, etc.

When the partitioning method is a range partitioning method, the partitioning rule can further indicate a range corresponding to each partition. When the partitioning method is a list partitioning method, the partitioning rule can further indicate a set of attribute values corresponding to each partition.

Step 204: Create the first partition table based on the attribute columns, and create a corresponding first quantity of logical partitions and physical partitions respectively corresponding to the logical partitions according to the partitioning rule.

The physical partitions here are in one-to-one correspondence with the logical partitions. Different from the logical partition, the physical partition is a partition that actually stores data, that is, is used to store data that is classified into a subset of corresponding logical partitions, and the physical partitions each have a globally unique partition identifier and is invisible to the user.

In addition, a mapping relationship between a logical partition and a physical partition can also be established. FIG. 1 is used as an example. The established mapping relationship can be shown in Table 1.

TABLE 1

| Logical partition 1 | Logical partition 2 | Logical partition 3 | Logical partition 4 |
|---|---|---|---|
| Physical partition A | Physical partition B | Physical partition C | Physical partition D |

Step 206: Add a composite primary key to the first partition table as a hidden primary key, where the composite primary key includes a partition identifier of the physical partition and a partition-level auto-increment identifier.

The above-mentioned partition-level auto-increment identifier is obtained by sequentially numbering, in a partition in a manner of auto-increment numbering, data that is divided into the partition.

FIG. 3 is a schematic diagram illustrating the first partition table with the added composite primary key. In FIG. 3, true column 1 to true column N are attribute columns in the first partition table, and a partition identifier and an auto-increment identifier are a composite primary key to be added to the first partition table.

It should be noted that, since the partition identifier of the physical partition is globally unique, when the partition identifier of the physical partition and the partition-level auto-increment identifier are used as the composite primary key, the uniqueness or validity of a primary key can be ensured when a partition management operation such as partition merging, partition switching, or partition splitting is performed on the first partition table. It should be understood that, when the primary key does not fail, data may not need to be rewritten. That is, for the above-mentioned first partition table, a corresponding partition management operation can be implemented without rewriting data.

In addition, after the composite primary key is added to the table with no primary keys (that is, the first partition table), a problem that data in the table with no primary keys cannot be stored by using LSM-Tree can be solved.

It should be further noted that, in actual application, the above-mentioned first table creation command can further include an index column of the first partition table. When the first table creation command further includes the index column, an index table corresponding to the first partition table can be further created based on the index column of the first partition table, the composite primary key (that is, the hidden primary key), and the partitioning key.

FIG. 4 is a schematic diagram illustrating the index table of the first partition table. It should be understood that a data row can be uniquely determined in the first partition table based on a partitioning key (also referred to as a primary table partitioning key) and a composite primary key in FIG. 4. Specifically, a partition can be located in the first partition table based on the partitioning key. In the partition, a data row can be uniquely determined based on the composite primary key.

It should be understood that FIG. 4 is merely an example description. In actual application, the index table shown in FIG. 4 can further include a partitioning key (an index table partitioning key) used to partition the index table. This is not limited in this specification.

In addition, when a partition management operation is performed on the first partition table, the composite primary key in the first partition table can always keep unique. Therefore, the validity of the index column can be ensured when the composite primary key is added to the index table. That is, in this solution, when partition merging and partition splitting are performed on the first partition table, there is no need to create an index again, thereby saving computing resources.

The method for creating the first partition table is described above. It should be understood that, after the first partition table is created, data can be written into the first partition table. A data writing method is described below.

FIG. 5 is a flowchart illustrating a data writing method for a partition table, according to some embodiments. The method can be performed by any apparatus, device, platform, or device cluster with computing and processing capabilities. As shown in FIG. 5, the method can include the following steps.

Step 502: Obtain a first data row to be written into a first partition table and a current partitioning rule for the first partition table.

It should be noted that the above-mentioned current partitioning rule can be an initial partitioning rule carried in a table creation command corresponding to the first partition table, or can be a partitioning rule modified after a partition management operation such as partition merging, partition splitting, or partition switching is performed on the first partition table.

The above-mentioned current partitioning rule indicates at least that the first partition table includes a partitioning key that is a basis for dividing data rows included in the first partition table to be written into logical partitions and a first quantity of partitions.

In addition, the above-mentioned current partitioning rule can further indicate a partitioning method, and the partitioning method here can include one of the following: a hash (Hash) partitioning method, a range (Range) partitioning method, a list (list) partitioning method, etc.

When the partitioning method is a range partitioning method, the current partitioning rule can further indicate a current range corresponding to each partition. The current range here can be an initial range or a modified range (which is modified when a partition management operation is performed). When the partitioning method is a list partitioning method, the current partitioning rule can further indicate a set of current attribute values corresponding to each partition.

Step 504: Determine a target logical partition corresponding to the first data row based on the current partitioning rule and a first attribute value of the first data row that corresponds to the partitioning key.

For example, the partitioning method is a hash partitioning method. The first attribute value modulo the first quantity of partitions can be calculated to obtain a modulo result. A logical partition with a corresponding partition number matching the modulo result among the corresponding logical partitions in the first partition table is used as the target logical partition corresponding to the first data row.

For another example, the partitioning method is a range partitioning method. A logical partition with a first attribute value falling within a corresponding range can be selected from the corresponding logical partitions in the first partition table, and the selected logical partition is used as the target logical partition corresponding to the first data row.

Step 506: Determine a target physical partition corresponding to the target logical partition based on a mapping relationship between a logical partition and a physical partition, where the target physical partition has a globally unique partition identifier.

For example, a corresponding target physical partition can be determined based on the mapping relationship shown in Table 1.

Step 508: Add the partition identifier of the target physical partition and an auto-increment identifier of the first data row to the first data row as a composite primary key value.

The auto-increment identifier of the first data row is obtained by adding 1 to a current data number corresponding to the target logical partition. For example, assuming that there are five data rows divided into the target logical partition in the first partition table, and a data number of the fifth data row is 005. In this case, the auto-increment identifier of the first data row can be 006.

Step 510: Store the first data row with the added composite primary key value to the first partition table.

It should be understood that after the composite primary key value (that is, a value of the hidden primary key or the composite primary key) is added to the first data row, the first data row can be stored by using LSM-tree. In addition, since the partition identifier of the physical partition is globally unique, the uniqueness of a primary key of the first data row can be ensured when a partition management operation is performed on the first partition table.

Optionally, for the above-mentioned first partition table, an operation command for performing the partition management operation on the first partition table can be further received. The partition management operation here includes one of the following: partition merging, partition switching, partition splitting, etc. The current partitioning rule is modified according to the operation command.

For example, the partitioning method is a hash partitioning method. If the partition management operation is partition merging or partition splitting, the modifying the current partitioning rule can include: adjusting the first quantity of partitions.

In the example of FIG. 1, assuming that logical partition 1 and logical partition 2 are merged, and the first quantity of partitions can be adjusted from 4 to 3.

For example, the partitioning method is a range partitioning method. If the partition management operation is partition merging or partition splitting, the modifying the current partitioning rule can include: adjusting the first quantity of partitions and a range of at least a part of partitions.

For example, assuming that the first partition table is divided into three logical partitions, and ranges corresponding to the three logical partitions are respectively (0, 100), (100, 200), and (200, 300). After the first two partitions are merged, the first quantity of partitions can be adjusted from 3 to 2, and corresponding ranges are adjusted to (0, 200) and (200, 300).

It should be noted that, through execution of the above-mentioned operation command, a corresponding partition management operation can be separately performed on each logical partition and each physical partition, so that a logical partition corresponding to a data row that has been stored to the first partition table also changes accordingly.

It should be understood that, after the current partitioning rule is modified, a new data row can be written into the first partition table based on the modified current partitioning rule. Details are as follows:

A second data row to be written into the first partition table and the modified current partitioning rule are obtained. The second data row is stored to the first partition table based on a second attribute value of the second data row that corresponds to the partitioning key and the modified current partitioning rule.

Herein, for a method for storing the second data row, reference can be made to the above-mentioned method for storing the first data row. Details are not described here again in this specification.

It should be noted that when the first partition table has an index table, after step 510 is performed, the following step can be further performed:

The index table of the first partition table is updated based on an index value of the first data row that corresponds to the index column, the composite primary key value, and a first attribute value of the partitioning key.

Since the composite primary key value of the first data row is also unique when the partition management operation is performed on the first partition table, the validity of the index table can be ensured when the composite primary key value is updated to the index table.

The method for writing data into the first partition table is described above, and a method for reading data from the first partition table is described below.

FIG. 6 is a flowchart illustrating a data reading method for a partition table, according to some embodiments. The method can be performed by any apparatus, device, platform, or device cluster with computing and processing capabilities. As shown in FIG. 6, the method can include the following steps.

Step 602: Obtain a first attribute value of a first data row to be read that corresponds to a partitioning key.

In an example, a query command can be received, and the query command can include a first attribute value of a partitioning key. The query command here can be, for example, a SELECT statement used to query a first partition table.

In another example, the above-mentioned query command can further include an index value of the first data row that corresponds to the index column.

Step 604: Determine a composite primary key value of the first data row based at least on the obtained first attribute value of the partitioning key.

The composite primary key value includes a partition identifier of a target physical partition corresponding to the first data row and an auto-increment identifier of the first data row. The partition identifier of the target physical partition is globally unique.

In an example, if the first partition table has no index table, the first partition table can be queried based on the first attribute value, to determine the composite primary key value of the first data row.

In another example, if the first partition table has an index table, the index value of the first data row that corresponds to the index column can be obtained first. Then, the index table of the first partition table is queried based on an index value and the first attribute value, to obtain the composite primary key value of the first data row.

In an example, the index value of the first data row that corresponds to the index column can be obtained from the above-mentioned query command.

It should be understood that the above-mentioned process of determining the composite primary key value of the first data row based on the first attribute value of the partitioning key can also be understood as a process of locating a partition.

Step 606: Read the first data row from the first partition table based on the composite primary key value.

It should be understood that, after a partition is located based on a first attribute of the partitioning key, the first data row can be uniquely determined from the partition based on the composite primary key value.

In conclusion, in embodiments of this specification, a data row can be uniquely determined from the first partition table based on the composite primary key value.

In summary, according to the data reading method for a partition table provided in embodiments of the specification, it can be ensured that a data row can be uniquely read based on the composite primary key value when a partition management operation is performed on the first partition table, that is, the composite primary key value added to the data row is always valid. Since the composite primary key value is valid, the validity of the index table can be ensured when the composite primary key value is added to the index table.

Corresponding to the above-mentioned method for creating a partition table, an embodiment of this specification further provides an apparatus for creating a partition table. As shown in FIG. 7, the apparatus can include a receiving unit 702, a creation unit 704, and an addition unit 706.

The receiving unit 702 is configured to receive a first table creation command, and the first table creation command includes at least attribute columns of a first partition table to be created and a partitioning rule. The first partition table is a table with no primary keys, and the partitioning rule indicates at least that the first partition table includes a partitioning key that is a basis for dividing data rows included in the first partition table to be written into logical partitions and a first quantity of partitions.

The above-mentioned partitioning rule further indicates a partitioning method, and the partitioning method includes one of the following: a hash partitioning method, a range partitioning method, and a list partitioning method.

The creation unit 704 is configured to create the first partition table based on the attribute columns, and create a corresponding first quantity of logical partitions and physical partitions respectively corresponding to the logical partitions according to the partitioning rule. The physical partitions each have a globally unique partition identifier.

The addition unit 706 is configured to add a composite primary key to the first partition table as a hidden primary key. The composite primary key includes the partition identifier of the physical partition and a partition-level auto-increment identifier.

Optionally, the above-mentioned first table creation command further includes an index column.

The creation unit 704 is further configured to create an index table corresponding to the first partition table based on the index column, the composite primary key, and the partitioning key.

The functions of the functional modules of the apparatus in the above-mentioned embodiments of this specification can be implemented by using the steps in the above-mentioned method embodiments. Therefore, a specific working process of the apparatus provided in one or more embodiments of this specification is omitted here for simplicity.

According to the apparatus for creating a partition table provided in embodiments of this specification, a valid primary key can be generated for a table with no primary keys, so as to store data by using LSM-Tree.

Figure 8:
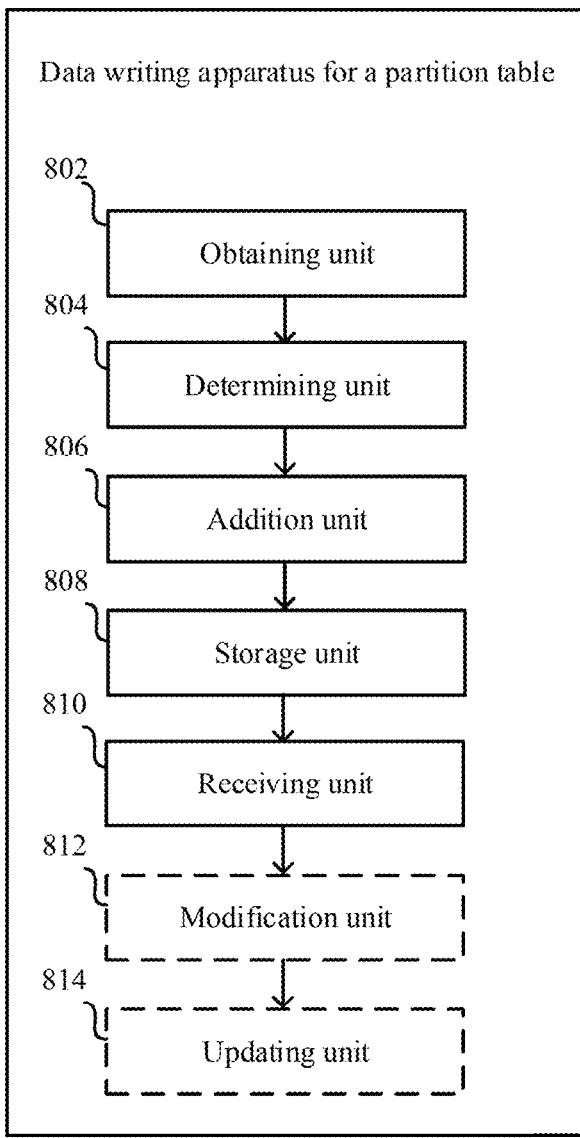
FIG. 8 is a schematic diagram illustrating a data writing apparatus for a partition table, according to some embodiments.

Corresponding to the above-mentioned data writing method for a partition table, an embodiment of this specification further provides a data writing apparatus for a partition table. As shown in FIG. 8, the apparatus can include: an obtaining unit 802, configured to obtain a first data row to be written into a first partition table and a current partitioning rule for the first partition table, where the current partitioning rule indicates at least that the first partition table includes a partitioning key that is a basis for dividing data rows included in the first partition table to be written into logical partitions and a first quantity of partitions; a determining unit 804, configured to determine a target logical partition corresponding to the first data row based on the current partitioning rule and a first attribute value of the first data row that corresponds to the partitioning key; where the determining unit 804 is further configured to determine a target physical partition corresponding to the target logical partition based on a mapping relationship between a logical partition and a physical partition, where the target physical partitions each have a globally unique partition identifier; an addition unit 806, configured to add the partition identifier of the target physical partition and an auto-increment identifier of the first data row to the first data row as a composite primary key value; and a storage unit 808, configured to store the first data row with the added composite primary key value to the first partition table.

Optionally, the current partitioning rule further indicates a partitioning method, and the partitioning method is a hash partitioning method.

The determining unit 804 is specifically configured to: calculate the first attribute value modulo the first quantity to obtain a modulo result; and use, as the target logical partition, a logical partition with a corresponding partition number matching result among the corresponding logical partitions in the first partition table.

Optionally, the current partitioning rule further indicates a partitioning method, and the partitioning method is a range partitioning method.

The determining unit 804 is specifically configured to: select, from the corresponding logical partitions in the first partition table, a logical partition with a first attribute value falling within a corresponding range; and use the selected logical partition as the target logical partition.

Optionally, the apparatus can further include: a receiving unit 810, configured to receive an operation command for performing a partition management operation on the first partition table, where the partition management operation includes one of the following: partition merging, partition switching, and partition splitting; and a modification unit 812, configured to modify the current partitioning rule according to the operation command.

Optionally, the obtaining unit 802 is further configured to obtain a second data row to be written into the first partition table and the modified current partitioning rule.

The storage unit 808 is further configured to store the second data row to the first partition table based on a second attribute value of the second data row that corresponds to the partitioning key and the modified current partitioning rule.

Optionally, the apparatus can further include: an updating unit 814, configured to update the index table of the first partition table based on an index value of the first data row that corresponds to the index column, the composite primary key value, and a first attribute value of the partitioning key.

The functions of the functional modules of the apparatus in the above-mentioned embodiments of this specification can be implemented by using the steps in the above-mentioned method embodiments. Therefore, a specific working process of the apparatus provided in one or more embodiments of this specification is omitted here for simplicity.

According to the data writing apparatus for a partition table provided in embodiments of this specification, a valid composite primary key value can be added to a data row, so as to store data by using LSM-Tree.

Figure 9:
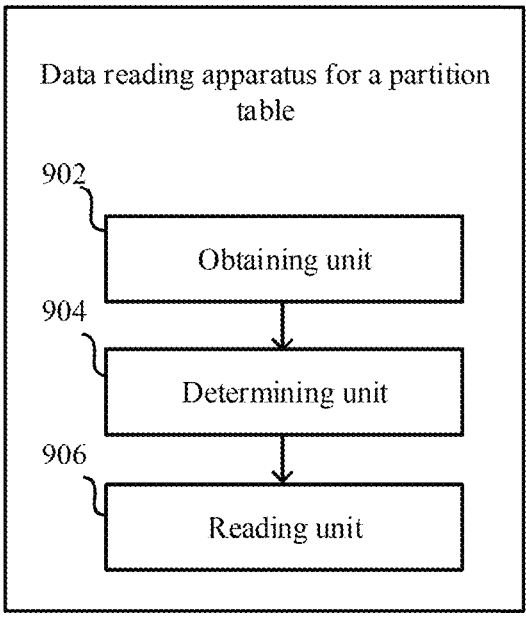
FIG. 9 is a schematic diagram illustrating a data reading apparatus for a partition table, according to some embodiments.

Corresponding to the above-mentioned data reading method for a partition table, an embodiment of this specification further provides a data reading apparatus for a partition table. As shown in FIG. 9, the apparatus can include an obtaining unit 902, a determining unit 904, and a reading unit 906.

The obtaining unit 902 is configured to obtain a first attribute value of a first data row to be read that corresponds to a partitioning key.

The determining unit 904 is configured to determine a composite primary key value of the first data row based at least on a first attribute value of the partitioning key. The composite primary key value includes a partition identifier of a target physical partition corresponding to the first data row and an auto-increment identifier of the first data row, and the target physical partition has a globally unique partition identifier.

The determining unit 904 is specifically configured to: receive a data query command, where the data query command includes at least an index value of the first data row that corresponds to an index column; and query the index table of the first partition table based on an index value and the first attribute value, to obtain the composite primary key value of the first data row. The index table is used to record a correspondence among an index column of the first partition table, a composite primary key, and the partitioning key.

The reading unit 906 is configured to read the first data row from a first partition table based on the composite primary key value.

The functions of the functional modules of the apparatus in the above-mentioned embodiments of this specification can be implemented by using the steps in the above-mentioned method embodiments. Therefore, a specific working process of the apparatus provided in one or more embodiments of this specification is omitted here for simplicity.

According to the data reading apparatus for a partition table provided in some embodiments of this specification, a data row can be uniquely determined based on the composite primary key value when a partition management operation is performed on the first partition table.

According to some embodiments of another aspect, a computer-readable storage medium is further provided. The computer-readable storage medium stores a computer program, and when the computer program is executed on a computer, the computer is enabled to perform the method described with reference to FIG. 2, FIG. 5, or FIG. 6.

According to some embodiments of still another aspect, a computing device is further provided, including a memory and a processor. The memory stores executable code, and when the processor executes the executable code, the method described with reference to FIG. 2, FIG. 5, or FIG. 6 is implemented.

Embodiments of this specification are all described in a progressive manner. For same or similar parts in the embodiments, mutual references can be made to the embodiments. Each embodiment focuses on a difference from other embodiments. Particularly, some device embodiments are briefly described since they are basically similar to some method embodiments. For related parts, references can be made to related descriptions in the method embodiments.

Method or algorithm steps described with reference to the content disclosed in this specification can be implemented by hardware, or can be implemented by the processor by executing a software command. The software command can include a corresponding software module. The software module can be stored in a RAM memory, a flash memory, a ROM memory, an EPROM memory, an EEPROM memory, a register, a hard disk, a removable hard disk, a CD-ROM, or any other form of storage medium well-known in the art. An example storage medium is coupled to the processor so that the processor can read information from the storage medium and can write information into the storage medium. Certainly, the storage medium can be a component of the processor. The processor and the storage medium can be disposed in an ASIC. In addition, the ASIC can be located in a server. Certainly, the processor and the storage medium can alternatively exist in the server as discrete components.

A person skilled in the art should be aware that, in the above-mentioned one or more examples, functions described in this application can be implemented by hardware, software, firmware, or any combination thereof. When implemented by using software, these functions can be stored in a computer-readable medium or transmitted as one or more commands or code on a computer-readable medium. The computer-readable medium includes a computer storage medium and a communications medium, where the communications medium includes any medium that enables a computer program to be transmitted from one place to another. The storage medium can be any available medium accessible to a general-purpose or a dedicated computer.

Specific embodiments of this specification are described above. Other embodiments fall within the scope of the appended claims. In some cases, the actions or steps described in the claims can be performed in an order different from that in the embodiments, and the desired results can still be achieved. In addition, the process depicted in the accompanying drawings does not necessarily need a particular sequence or consecutive sequence to achieve the desired results. In some implementations, multitasking and parallel processing are feasible or may be advantageous.

The objectives, technical solutions, and beneficial effects of this specification are further described in detail in the above-mentioned specific implementations. It should be understood that the above-mentioned descriptions are merely some specific implementations of this specification, but are not intended to limit the protection scope of this specification. Any modification, equivalent replacement, or improvement made based on the technical solutions in this specification shall fall within the protection scope of this specification.

What is claimed is:

1. A computer-implemented method for partition table data writing, comprising:

obtaining a first data row to be written into a first partition table and a current partitioning rule for the first partition table, wherein the current partitioning rule indicates at least that the first partition table comprises a partitioning key that is a basis for dividing data rows comprised in the first partition table to be written into logical partitions and a first quantity of partitions;

determining a target logical partition corresponding to the first data row based on the current partitioning rule and a first attribute value of the first data row that corresponds to the partitioning key;

determining a target physical partition corresponding to the target logical partition based on a mapping relationship between a logical partition and a physical partition, wherein the target physical partition has a globally unique partition identifier;

obtaining a partition-level auto-increment identifier of the first data row by incrementing an existing partition-level auto-increment identifier of the last data row in existing data rows that are divided into a same target logical partition as the first data row;

adding, as a composite primary key value, the globally unique partition identifier of the target physical partition and the partition-level auto-increment identifier of the first data row to the first data row; and storing the first data row with the composite primary key value to the first partition table.

2. The computer-implemented method of claim 1, wherein:

the current partitioning rule further indicates a partitioning method and the partitioning method is a hash partitioning method; and the determining a target logical partition corresponding to the first data row comprises:

calculating a first attribute value modulo of the first quantity of partitions to obtain a modulo result; and using, as the target logical partition, a logical partition with a corresponding partition number matching the modulo result among corresponding logical partitions in the first partition table.

3. The computer-implemented method of claim 1, wherein:

the current partitioning rule further indicates a partitioning method and the partitioning method is a range partitioning method; and the determining a target logical partition corresponding to the first data row comprises:

selecting, from corresponding logical partitions in the first partition table and as a selected logical partition, a logical partition with a first attribute value falling within a corresponding range; and using the selected logical partition as the target logical partition.

4. The computer-implemented method of claim 1, comprising:

receiving an operation command for performing a partition management operation on the first partition table, wherein the partition management operation comprises one of: partition merging, partition switching, and partition splitting; and modifying, as a modified current partitioning rule, the current partitioning rule of the operation command.

5. The computer-implemented method of claim 4, comprising:

obtaining a second data row to be written into the first partition table and the modified current partitioning rule.

6. The computer-implemented method of claim 5, comprising:

storing, based on the modified current partitioning rule and a second attribute value of the second data row that corresponds to the partitioning key, the second data row to the first partition table.

7. The computer-implemented method of claim 1, comprising:

updating an index table of the first partition table based on an index value of the first data row that corresponds to an index column, the composite primary key value, and the first attribute value of the partitioning key.

8. A non-transitory, computer-readable medium storing one or more instructions executable by a computer system to perform one or more operations for partition table data writing, comprising:

obtaining a first data row to be written into a first partition table and a current partitioning rule for the first partition table, wherein the current partitioning rule indicates at least that the first partition table comprises a partitioning key that is a basis for dividing data rows comprised in the first partition table to be written into logical partitions and a first quantity of partitions;

determining a target logical partition corresponding to the first data row based on the current partitioning rule and a first attribute value of the first data row that corresponds to the partitioning key;

determining a target physical partition corresponding to the target logical partition based on a mapping relationship between a logical partition and a physical partition, wherein the target physical partition has a globally unique partition identifier;

obtaining a partition-level auto-increment identifier of the first data row by incrementing an existing partition-level auto-increment identifier of the last data row in existing data rows that are divided into a same target logical partition as the first data row;

adding, as a composite primary key value, the globally unique partition identifier of the target physical partition and the partition-level auto-increment identifier of the first data row to the first data row; and storing the first data row with the composite primary key value to the first partition table.

9. The non-transitory, computer-readable medium of claim 8, wherein:

the current partitioning rule further indicates a partitioning method and the partitioning method is a hash partitioning method; and the determining a target logical partition corresponding to the first data row comprises:

calculating a first attribute value modulo of the first quantity of partitions to obtain a modulo result; and using, as the target logical partition, a logical partition with a corresponding partition number matching the modulo result among corresponding logical partitions in the first partition table.

10. The non-transitory, computer-readable medium of claim 8, wherein:

the current partitioning rule further indicates a partitioning method and the partitioning method is a range partitioning method; and the determining a target logical partition corresponding to the first data row comprises:

selecting, from corresponding logical partitions in the first partition table and as a selected logical partition, a logical partition with a first attribute value falling within a corresponding range; and using the selected logical partition as the target logical partition.

11. The non-transitory, computer-readable medium of claim 8, comprising:

receiving an operation command for performing a partition management operation on the first partition table, wherein the partition management operation comprises one of: partition merging, partition switching, and partition splitting; and modifying, as a modified current partitioning rule, the current partitioning rule of the operation command.

12. The non-transitory, computer-readable medium of claim 11, comprising:

obtaining a second data row to be written into the first partition table and the modified current partitioning rule.

13. The non-transitory, computer-readable medium of claim 12, comprising:

storing, based on the modified current partitioning rule and a second attribute value of the second data row that corresponds to the partitioning key, the second data row to the first partition table.

14. The non-transitory, computer-readable medium of claim 8, comprising:

updating an index table of the first partition table based on an index value of the first data row that corresponds to an index column, the composite primary key value, and the first attribute value of the partitioning key.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, comprising:

obtaining a first data row to be written into a first partition table and a current partitioning rule for the first partition table, wherein the current partitioning rule indicates at least that the first partition table comprises a partitioning key that is a basis for dividing data rows comprised in the first partition table to be written into logical partitions and a first quantity of partitions;

determining a target logical partition corresponding to the first data row based on the current partitioning rule and a first attribute value of the first data row that corresponds to the partitioning key;

determining a target physical partition corresponding to the target logical partition based on a mapping relationship between a logical partition and a physical partition, wherein the target physical partition has a globally unique partition identifier;

obtaining a partition-level auto-increment identifier of the first data row by incrementing an existing partition-level auto-increment identifier of the last data row in existing data rows that are divided into a same target logical partition as the first data row;

adding, as a composite primary key value, the globally unique partition identifier of the target physical partition and the partition-level auto-increment identifier of the first data row to the first data row; and storing the first data row with the composite primary key value to the first partition table.

16. The computer-implemented system of claim 15, wherein:

the current partitioning rule further indicates a partitioning method and the partitioning method is a hash partitioning method; and the determining a target logical partition corresponding to the first data row comprises:

calculating a first attribute value modulo of the first quantity of partitions to obtain a modulo result; and using, as the target logical partition, a logical partition with a corresponding partition number matching the modulo result among corresponding logical partitions in the first partition table.

17. The computer-implemented system of claim 15, wherein:

the current partitioning rule further indicates a partitioning method and the partitioning method is a range partitioning method; and the determining a target logical partition corresponding to the first data row comprises:

selecting, from corresponding logical partitions in the first partition table and as a selected logical partition, a logical partition with a first attribute value falling within a corresponding range; and using the selected logical partition as the target logical partition.

18. The computer-implemented system of claim 15, comprising:

receiving an operation command for performing a partition management operation on the first partition table, wherein the partition management operation comprises one of: partition merging, partition switching, and partition splitting; and modifying, as a modified current partitioning rule, the current partitioning rule of the operation command.

19. The computer-implemented system of claim 18, comprising:

obtaining a second data row to be written into the first partition table and the modified current partitioning rule.

20. The computer-implemented system of claim 19, comprising:

storing, based on the modified current partitioning rule and a second attribute value of the second data row that corresponds to the partitioning key, the second data row to the first partition table.

* * * * *